United States Patent [19]

Chase

[11] Patent Number: 4,724,189
[45] Date of Patent: Feb. 9, 1988

[54] CONVERSION MODULE SYSTEM

[76] Inventor: Frank Chase, 2250 Par La. #1209, Willoughby Hills, Ohio 44094

[21] Appl. No.: 739,515

[22] Filed: May 31, 1985

[51] Int. Cl.$^4$ .............................................. H01M 2/10
[52] U.S. Cl. ........................................ 429/99; 429/159
[58] Field of Search ..................... 429/99, 96, 100, 97, 429/98, 159

[56] References Cited

U.S. PATENT DOCUMENTS

| | | | |
|---|---|---|---|
| 1,627,264 | 5/1927 | Baird | 429/99 |
| 2,058,755 | 10/1936 | Arnesen | 429/99 |
| 3,056,850 | 10/1962 | Rauske et al. | 429/159 |
| 3,553,033 | 8/1968 | Page | 429/159 |
| 3,650,841 | 3/1972 | Brindley | 429/159 |
| 3,887,393 | 6/1975 | Rue | 429/99 |
| 4,125,681 | 11/1978 | Sjogien | 429/99 |
| 4,205,121 | 5/1980 | Naitoh | 429/99 |
| 4,227,140 | 10/1980 | Nardella et al. | 429/99 X |
| 4,389,469 | 6/1983 | Nicholls | 429/99 X |
| 4,407,911 | 10/1983 | Hooke | 429/99 X |
| 4,593,461 | 6/1986 | Thiele et al. | 429/100 |

Primary Examiner—Donald L. Walton
Attorney, Agent, or Firm—Peter D. Sacntjen

[57] ABSTRACT

A conversion module system operable in any standard lantern which is generally powered by a single 6 volt "La Clanche" type battery. The system accomodates four rechargeable "D" size batteries primarily, but carbon-zinc or alkaline batteries can be used also. This module system therefore is a container of said batteries connected in series within, producing 6 volts D.C. Its dimension conforms closely, but not necessarily to the exact size of the 6 volt "La Clanche" type battery. This module, when containing rechargeable "D" size batteries, will produce at least 500 times longer lasting power than one ordinary carbon-zinc throwaway battery.

4 Claims, 5 Drawing Figures

CONVERSION MODULE SYSTEM

BACKGROUND OF INVENTION

The present invention generally relates to a device, adapted to provide longer lasting source of energy for any presently made household lantern. The power supplied to such lanterns is the 6 volt standard throwaway kind, be it carbon-zinc or alkaline, costing a considerable amount in the long run. To overcome this shortcoming of the throwaway battery, the present invention is aimed to fill the gap between what is currently available and what is not yet developed, namely a rechargeable nickel-cadmium 6 volt battery.

There is a rapid development of miniaturization in the field of audio and video devices, in lap size computers, and to operate these, a lot of throwaway batteries are being used. The development of a long lasting, lighter and less expensive battery is rather slow. Therefore one of the objects of the present invention is to use the available rechargeable batteries more economically.

Another object is to provide a convenient way to recharge four "D" size batteries within a module.

Yet another object of the invention is to recharge carbon-zinc batteries contained within the module, to extend their useful life at least ten times longer. However this can only be accomplished when the batteries are not completely exhausted.

BRIEF DESCRIPTION OF THE DRAWINGS

The advantages become apparent from the specification, taken in conjunction with the drawings of the invention in which.

DETAILED DESCRIPTION OF THE INVENTION

Figure 1:
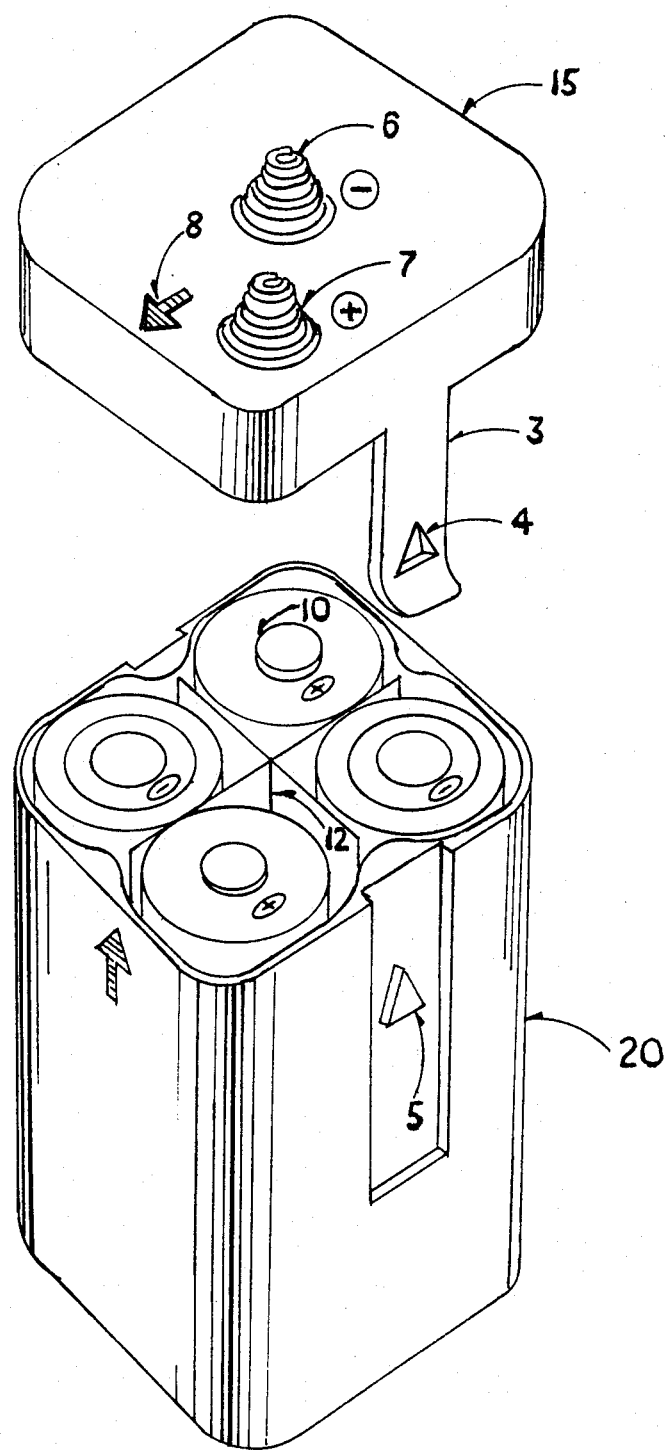
FIG. 1 is a perspective view of the invention, the top part 15, and bottom part 20, separated to enable the viewer to see the arrangement of "D" batteries. As shown it is immediately recognized that the four "D" size batteries are connected in series thereby 6 volts D.C. current produced. It is also shown that both parts of the invention recessed on two opposite sides to accomodate the snap closure without protrusion.

Referring to the drawings in FIG. 1 the top part 15 of the invention or conversion module has two spring terminals same as a "La Clanche" battery may have, the negative terminal 6 at the geometrical center, and the positive terminal 7 placed at half inch from each side in the corner. They are connected to conductive strips 13 and 14 to facilitate to connection to one "D" battery at its positive end and another "D" battery at its negative end. Another conductive strip 17 is to keep continuity of the connection of "D" batteries in series. On two sides of the invention there are closing strips 3 opposite to one to another, each having a hole which may be of any geometrical form. On the drawing a triangular shaped hole 4 is shown. These strips are slightly curved outward at their lower end, to provide for the fingers to pry-open the invention. The bottom part 20 of the invention is recessed on two opposite sides where a post 5 placed. The placement of the four "D" size batteries 10 respective to their poles are also visible. To insulate the said batteries from one another a divider 12 is also visible, which is made of thin nonconductive material.

Figure 2:
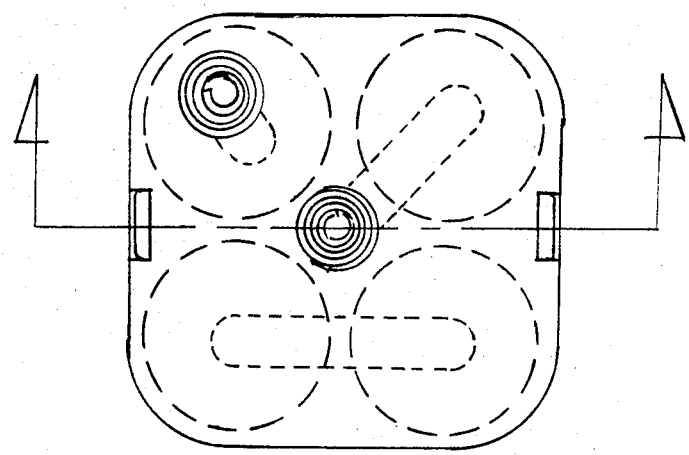
FIG. 2 is a top view and sectional drawing of the invention incorporating the "D" size rechargeable batteries, making up the whole unit showing the constructional structure thereof.
Figure 2:
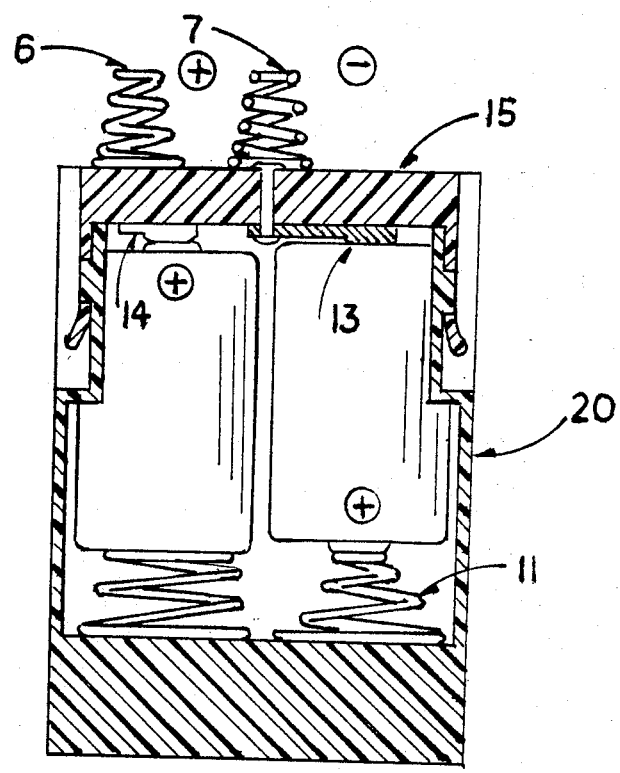
Figures 3, 4:
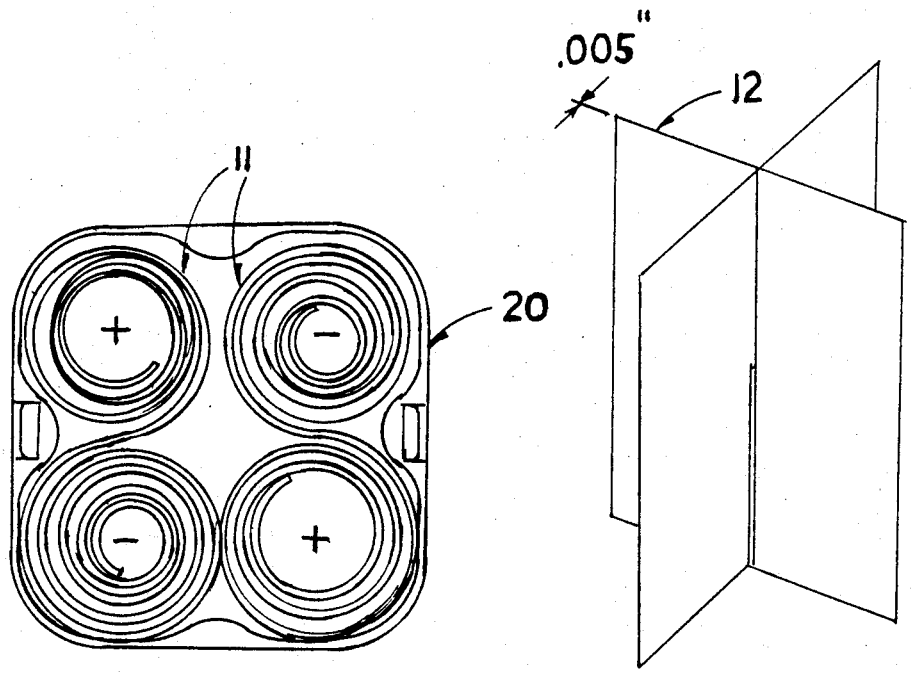
FIG. 3 is a view of the conical compressible spring arrangement.
FIG. 4 is a perspective view of the divider arrangement of the four "D" size batteries.
Figure 5:
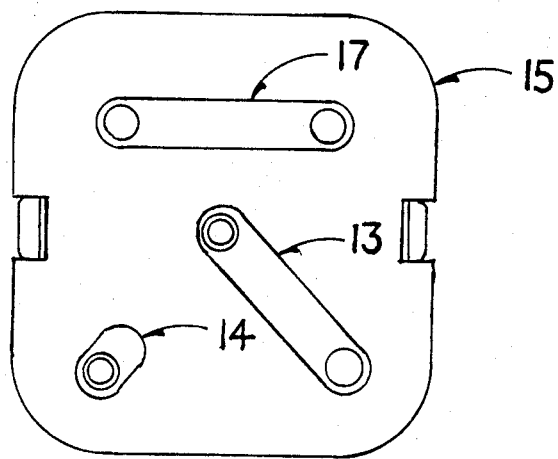
FIG. 5 is a bottom view of the top part 15 showing the connecting strips to the spring terminals, and between two batteries.

Referring to the drawing in FIG. 2 is an illustration as to how the two parts 15 and 20 are held together, containing the "D" size batteries. The conical, compressible spring arrangements serve two purposes; one is to facilitate connection of a pair of batteries in each half of bottom part or container 20 and the other purpose is to secure the closing of part 15 and 20, as the compression of springs generate pressure on the closing strips 3 and posts 5.

Following from the preceeding description, this invention when rechargeable "D" batteries are contained within, can be used in lieu of throwaway "La Clanche" type battery to power lanterns of many design. The advantage is that it will operate any device using a 6 volt battery hundreds of times longer than carbon-zinc or even alkaline type, however these types can be used.

Another advantage of this invention that recharging is convenient by using a 6 volt 200 ma charger, having two alligator clips such as a burgess model 11 lantern battery charger, and just simply connect it to the spring terminals 6 and 7 respectively, while the four "D" size batteries are contained within. Further, yet another advantage can be proven. When this invention is used in a device called "power supply system" previously invented by this petitioner Ser. No. 604,964 it will enable the user of such device, to recharge the unit placed inside it thru the jack of said "power supply system" with a burgess model 11 charger having a 3.5 mm pin instead two alligator clips.

With such an arrangement "walkman"s, "watchman"s, microcomputers, CD players, vacuum cleaners of the portable kind can be operated so economically that was heretofore not possible.

The disclosure described hereinabove represents the preferred embodiments of the invention, however any variations thereof in the form, construction material and modified application of the invention is entirely possible, without departing from the scope and spirit of the appended claims.

I claim:

1. A conversion module system for releasably electrically connecting four "D" size batteries in series to produce a six volt direct current output, comprising:
   a one piece base member molded from a plastic material, said base member having a peripheral envelope substantially the same as a "La Clanche" type lantern battery and defined by a horizontal bottom wall and a vertical side wall, the inner surfaces of said walls being configured to releasably retain four "D" size batteries having terminals at the ends thereof in a first battery pair and a second battery pair, said battery pairs being in adjacent side by side relationship;
   first spring means carried on the inner surface of said bottom wall of said base member and comprising first and second electrically conductive resilient members respectively engagable with the terminals of the batteries in said first battery pair;

second spring means carried on the inner surface of said bottom wall of said base member and comprising third and fourth electrically conductive resilient members respectively engagable with the terminals of the batteries in said second battery pair;

a lid member molded from a plastic material, said lid member having a peripheral envelope substantially the same as a "La Clanche" type lantern battery and defined by a top wall, a side wall and a bottom wall;

means cooperating between said base member and said side walls of said lid member for locating said lid member with respect to said base member with the distance between said bottom wall of said lid member and said spring means being less than the length between the terminals of said batteries whereby in assembly the batteries will be compressively held therebetween;

a first electrically conductive strip member carried on said bottom wall of said lid member and engagable with the end terminals of one of the batteries in said first battery pair and one of the batteries in said second battery pair;

a second electrically conductive strip member carried on said bottom wall of said lid member and engagable with the terminals of other of the batteries in said first battery pair;

first exterior terminal means located substantially at the geometric center of said top wall of said lid member and electrically connected to said second electrically conductive strip member and one of the batteries in said second battery pair;

a third electrically conductive strip member carried on said bottom wall of said lid member and engagable with the terminals of other of the batteries in said second battery pair;

second exterior terminal means located diagonally offset from said geometric center of said top wall of said lid member and electrically connected to said third electrically conductive strip member and the other one of the batteries in said first battery pair;

manually releasable vertically extending, elongated finger means associated with one of said base member and said lid member and resiliently engagable with tab members formed on the outer surface of the other of said base member and said lid member for releasably fixedly connecting said base member to said lid member.

2. The conversion module system as recited in claim 1 wherein said resilient members of said spring means are interconnected conical springs formed of a single length of electrically conductive wire.

3. The conversion module system as recited in claim 2 wherein said finger means extend vertically downwardly from said lid member and are provided with apertures for releasably engaging said tab member and said tab members are formed integrally on and project outwardly from said outer surface of said side walls of said base member.

4. The conversion module system as recited in claim 3 wherein said finger means consist of a pair of narrow strips having a upper end attached to said lid member and an outwardly curved lower end, said strips being slidably received within recesses formed in said side walls of said base member and including an aperture for receiving said tab member, said tab member being formed on said side wall at said recess.

* * * * *